United States Patent [19]
Grace et al.

[11] 3,947,744
[45] Mar. 30, 1976

[54] ELECTRIC TRUCK HAVING ELEVATED LOAD POTENTIAL ENERGY RECOVERY WITH MEANS TO ADJUST RATE OF CARRIAGE DESCENT

[75] Inventors: Michael H. Grace, Griffith, Ind.; Arvin Karazija, Oak Forest, Ill.

[73] Assignee: Allis-Chalmers Corporation, Milwaukee, Wis.

[22] Filed: Oct. 21, 1974

[21] Appl. No.: 516,809

[52] U.S. Cl. .................. 320/61; 320/14; 322/72; 318/139; 290/50
[51] Int. Cl.² ......................................... H02J 7/00
[58] Field of Search .......... 320/14, 61, 64; 318/139, 318/376; 322/29–31, 72; 290/50

[56] References Cited
UNITED STATES PATENTS

| | | | |
|---|---|---|---|
| 3,512,072 | 5/1970 | Karazija et al. | 320/14 X |
| 3,546,548 | 12/1970 | Wouk | 318/139 |
| 3,628,621 | 12/1971 | Lee | 318/139 X |

Primary Examiner—J. D. Miller
Assistant Examiner—Robert J. Hickey
Attorney, Agent, or Firm—Lee H. Kaiser

[57] ABSTRACT

A lift truck energized from a battery to supply pressurized fluid to elevate a load-supporting carriage has an energy recovery system for converting kinetic energy of the elevated carriage into battery charging current including a fluid motor through which fluid from the lift ram is exhausted when the carriage is descending, an alternator driven by the fluid motor, a rectifier between alternator and battery, a transistor having its emitter-collector circuit in series with the field winding of the alternator, and a rate-of-descent adjusting potentiometer for selectively varying base drive to the transistor to thereby regulate field excitation of the alternator and the regenerative braking of the fluid motor.

14 Claims, 3 Drawing Figures

ELECTRIC TRUCK HAVING ELEVATED LOAD POTENTIAL ENERGY RECOVERY WITH MEANS TO ADJUST RATE OF CARRIAGE DESCENT

BACKGROUND OF THE INVENTION

1. Field of the Invention

This invention relates to a system for converting the potential energy of an elevated load such as a load supported on the carriage of a forklift truck into useful energy such as battery charging current, and particularly to an electrical control for such a system which permits adjustment of the rate of descent of the elevated load.

2. Description of the Prior Art

It is known in the prior art to provide a potential energy recovery system in a forklift truck having means for converting the potential energy of a loaded carriage into electrical energy as the carriage descends on the mast such as, for example, in U.S. Pat. No. 3,512,072 of A. Karazija et al.

STATEMENT OF THE INVENTION

It is an object of the invention to provide an improved system for recovering the potential energy of a loaded or unloaded mast carriage of a forklift truck as it descends on the mast.

It is another object of the invention to provide an improved electrical control for such a potential energy recovery system in a forklift truck which permits adjustment of the rate of descent of the carriage.

BRIEF DESCRIPTION OF THE DRAWINGS

Further objects and advantages of the invention will become apparent from the following description taken in conjunction with the accompanying drawings in which.

DESCRIPTION OF THE PREFERRED EMBODIMENT

Figure 1:
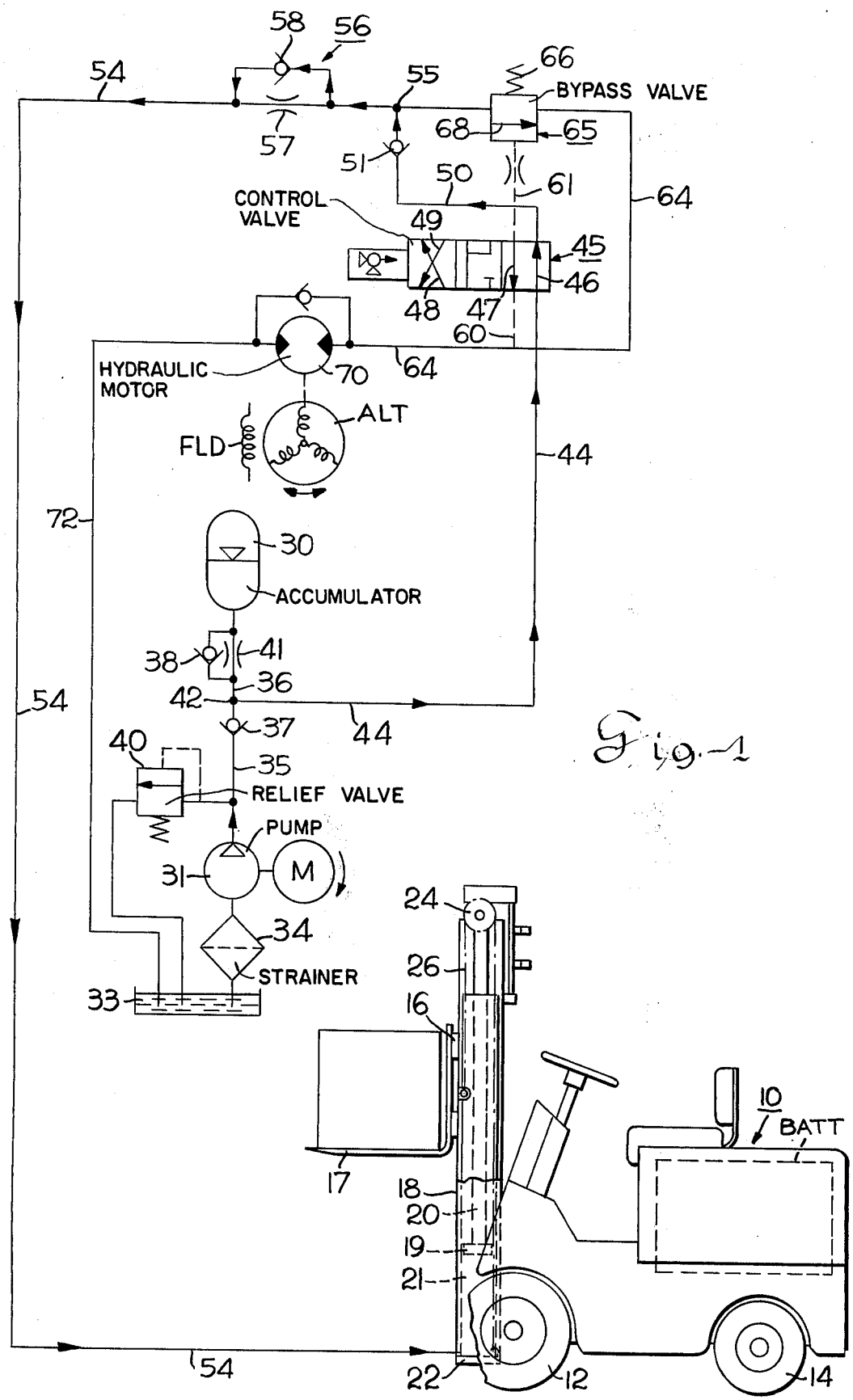
FIG. 1 is a side view of a forklift truck having a vertically movable carriage and includes a schematic hydraulic circuit for the lift ram which emphasizes a hydraulic flow path for the upward extension of the ram.

Referring now to the drawings, the invention is shown incorporated in an electric lift truck 10 having a pair of drive wheels 12 and a pair of steerable wheels 14. A load carriage 16 with its load supporting forks 17 is raised and lowered on the mast 18 by a piston 19 of the lift ram 20 that moves in a hydraulic cylinder 21 which is supported on a transverse base plate 22 of the mast 18. Hydraulic fluid is admitted to or exhausted from hydraulic cylinder 21 as the piston 19 is raised or lowered by means of a conduit 54. The piston 19 of the lift ram 20 carries at its upper end a suitable pulley 24 over which a lift chain 26 is trained. One end of lift chain 26 is connected to the carriage 16 and its other end is connected to the base plate 22, whereby extension and contraction of the ram 20 is communicated to the carriage 16 through chain 26. The carriage 16 is guided for reciprocating upward or downward movement by the mast structure. The raised carriage 16, whether or not carrying a load, represents potential energy which can be converted into kinetic energy on downward movement.

Description of Hydraulic Circuit During Raising of the Carriage

Pressurized oil or other hydraulic fluid is stored in an accumulator 30. Hydraulic fluid is pumped into the accumulator 30 by a pump 31 driven by an electric motor M. The suction line of pump 31 is connected to sump 33 through strainer 34. The output of pump 31 is delivered to accumulator 30 by conduits 35, 36 in series with one-way check valves 37 and 38. A relief valve 40 to sump 33 is connected to pump output line 35. The pressurized hydraulic fluid stored in accumulator 30 flows through line 36 and its flow-regulating constriction 41, thence to junction 42, and into line 44 which leads to a proportional electrohydraulic control valve 45 to permit hydraulic flow through line 44 whenever control valve 45 is moved from its central neutral position to its "raise" or "lower" positions.

Assume that it is desired to move the piston 19 of lift ram 20 upwardly to elevate the carriage 16 on mast 18. It will be noted that control valve 45 has parallel valve passages 46 and 47 used in connection with extension of ram 20 and also has crossed valve passages 48 and 49 used in connection with retraction of the ram. For upward movement of carriage 16, control valve 45 is electrically moved from its central neutral position to its "raise" position shown in FIG. 1 in which valve passage 46 is aligned with the hydraulic conduit 44. With the control valve 45 in its "raise" position, pressurized hydraulic fluid from conduit 44 passes to the ram 20 by way of valve passage 46 in control valve 45, a conduit 50 having a one-way check valve 51, and a hydraulic conduit 54 connected to conduit 50 at a junction 55. A flow regulating valve unit 56 installed in line 54 has a pair of parallel flow paths including a flow constriction device 57 and a one-way check valve 58. One-way check valve 58 permits full hydraulic fluid flow toward the lift ram cylinder but prevents fluid flow through check valve 58 in a direction away from the ram cylinder. Hydraulic fluid exhausting from the lift ram cylinder 21 must pass through flow constriction device 57 which prevents excessively rapid descent of carriage 16 in the event of rupture of a conduit downstream therefrom or failure of the electrical loading means disclosed hereinafter.

Control valve 45 is provided with a passage 47 which in the FIG. 1 "raise" position is aligned with the stationary conduit 60 and with pilot pressure conduit 61 to provide drainage to the hydraulic line 64 and to insure that a bypass, or holding valve 65 will remain in its closed position under the urging of a spring 66 and thereby block communication between conduits 54 and 64.

Figure 2:
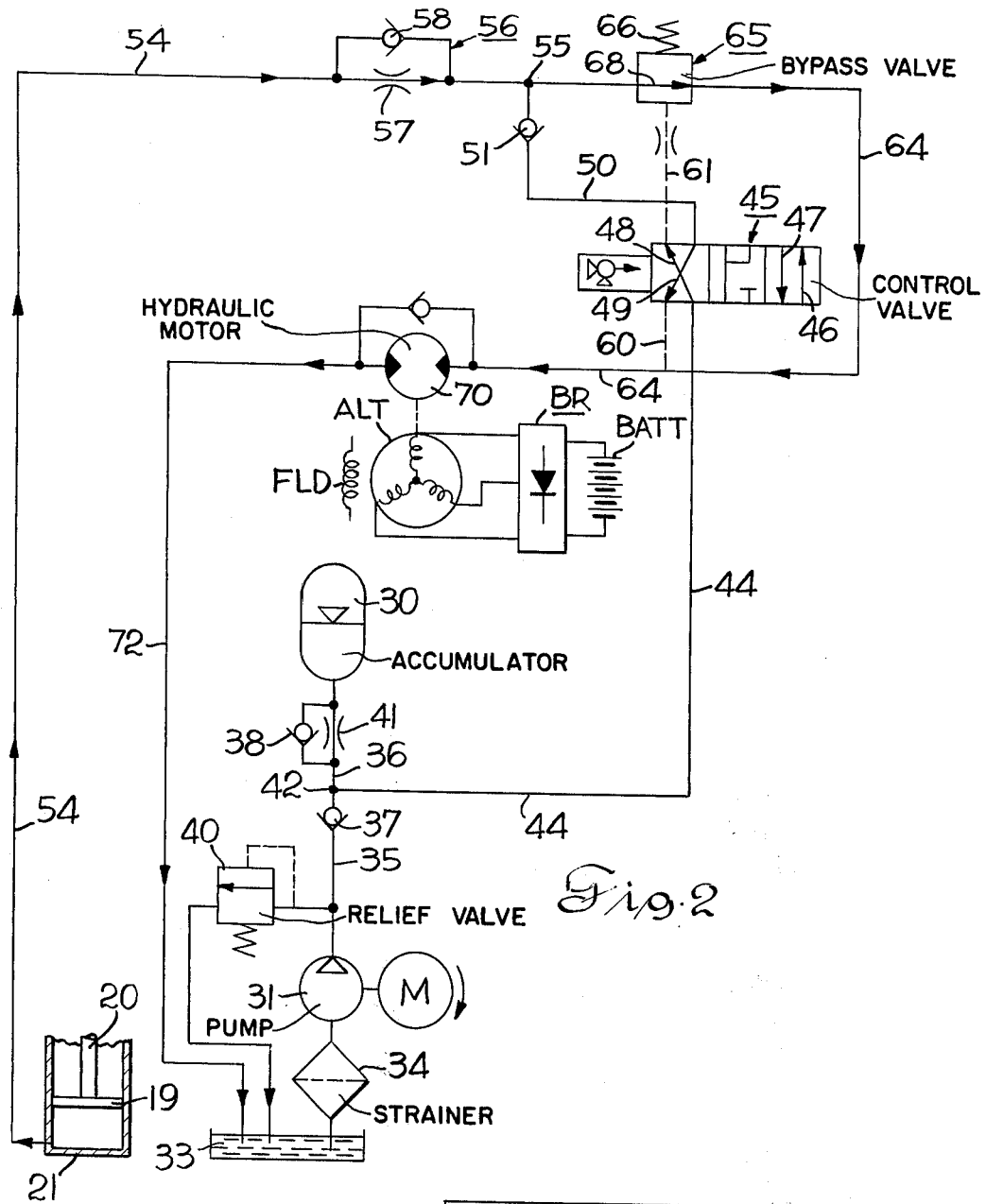
FIG. 2 is a view of a schematic hydraulic circuit similar to FIG. 1 but emphasizing the hydraulic flow path for the retraction of the ram during which battery charging occurs.

Referring now to FIG. 2 which emphasizes the hydraulic flow path for downward movement of carriage 16, it will be noted that control valve 45 has been moved by solenoid or manual means (not shown) to its "lower" position in which the crossed valve paths 48 and 49 respectively communicate with: (1) the pilot pressure line 61 leading to the bypass valve 65, and (2) the line 50 which leads to junction 55. The pressurized fluid from line 44 flowing through valve passage 48 and pilot line 61 actuates bypass valve 65 from its spring-biased closed position shown in FIG. 1 to its open position (shown in FIG. 2) in which valve passage 68 places hydraulic line 54 leading from the ram cylinder 21 in hydraulic communication with the hydraulic bypass line 64. The fluid in lift ram cylinder 21 can now exhaust through constriction device 57, junction 55, passage 68 in bypass valve 65, bypass line 64 and thence through a fluid motor 70 which drives an electrical alternator ALT. Hydraulic fluid discharged from fluid motor 70 passes to sump 33 through discharge line 72. The hydraulic fluid exhausting from the ram cylinder 21 on downward movement of piston 19 must pass through constriction device 57 since the one-way check valve 58 is seated and is prevented by one-way check valve 51 from passing through hydraulic line 50. Hydraulic fluid exhausted from ram cylinder 21 on the downward movement of carriage 16 is thus directed through fluid drive motor 70 which turns alternator ALT.

Figure 3:
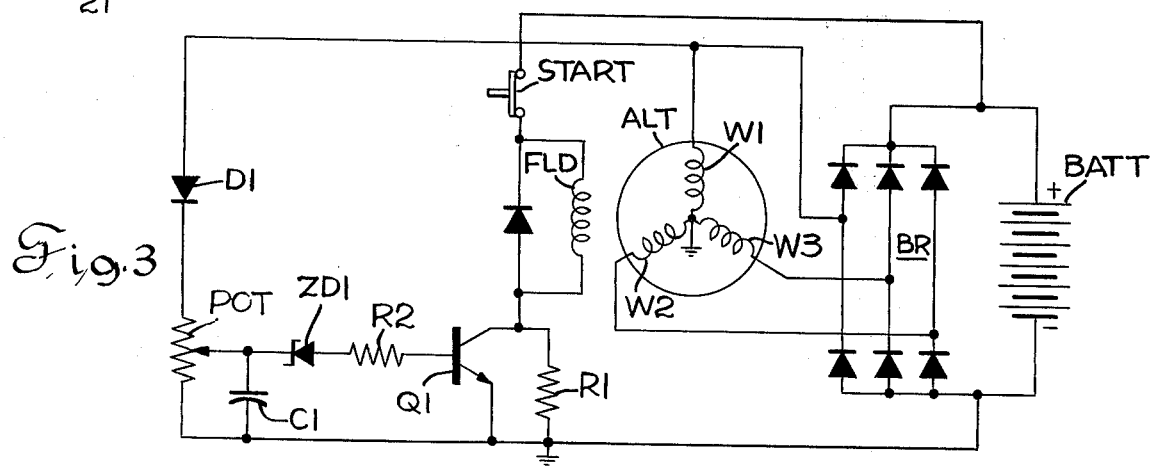
FIG. 3 is a schematic electrical circuit incorporating a preferred embodiment of electrical control for the potential energy recovery system of FIGS. 1 and 2.

As shown in FIG. 3, the stator windings W1, W2, and W3 of alternator ALT are coupled through a bridge rectifier BR to a battery BATT so that alternating voltages induced in windings W1, W2, W3 are rectified and charge the battery when the field winding FLD of alternator ALT is excited. Alternator winding FLD is connected in series with a start switch START and a resistance R1 across battery BATT so that only a trickle unidirectional current flows from battery BATT through winding FLD and the alternator excitation field is relatively weak when fluid motor 70 is at rest. One stator winding of the alternator such as W1 is coupled through a diode D1 and the resistance element of a rate-of-descent adjusting potentiometer POT to ground. When the rotor of alternator ALT is driven by fluid motor 70, an alternating voltage of relatively low magnitude is induced in stator winding W1 by the rotating field flux generated by the trickle current flowing through winding FLD. The positive half cycles of the alternating voltage induced in winding W1 are passed by diode D1 and develop a voltage across potentiometer POT which charges a capacitor C1 connected between the slider of potentiometer POT and ground to a positive potential. The magnitude of the voltage induced in stator winding W1 is directly proportional to the rpm of the alternator rotor, and potentiometer POT and capacitor C1 integrate the pulses passing through diode D1 and charge capacitor C1 to a voltage proportional to the speed of the alternator and to the field excitation.

The emitter-collector circuit of a transistor Q1 is connected in shunt to resistance R1, and a Zener diode ZD1 in series with a resistance R2 is coupled between capacitor C1 and the base of transistor Q1. Transistor Q1 is normally turned off so that the unidirectional exciting current from battery BATT flowing through field winding FLD is limited by resistance R1. When the voltage developed across capacitor C1 reaches a predetermined magnitude, Zener diode ZD1 breaks down and applies base drive through resistance R2 to transistor Q1 so that it conducts. Current from battery BATT now flows through field winding FLD in series with the emitter-collector circuit of transistor Q1 and increases the excitation field generated by winding FLD.

When control valve 45 is actuated to its "lower" position, fluid exhausted from cylinder 21 drives fluid motor 70 and rotates alternator ALT. When the alternator ALT is driven at a predetermined speed, the voltage developed across capacitor C1 breaks down Zener diode ZD1 to turn on transistor Q1 and thereby apply base drive to transistor Q1 and increase the excitation field of the alternator. The rotating alternator field induces voltages in stator windings W1, W2, and W3 which are rectified by rectifier BR and charge battery BATT to thereby convert the kinetic energy of the descending carriage 16 into electrical energy to charge the battery BATT.

The alternator ALT is regeneratively braked when the increased excitation field cuts the stator windings W1, W2, and W3 and thereby mechanically loads fluid motor 70 to slow the rate of descent of carriage 16. The alternating signal induced in winding W1 and applied across potentiometer POT is also increased in magnitude and thereby increases the voltage developed across capacitor C1 and the base drive to transistor Q1. However, the base drive to transistor Q1 can be selectively varied by potentiometer POT, thereby permitting selective adjustment of the collector current in transistor Q1. Inasmuch as the collector current in transistor Q1 also flows through field winding FLD, it will be appreciated that the magnitude of the excitation field, the regenerative braking of the alternator, the mechanical loading of fluid motor 70, and the rate of descent of carriage 16 are all directly controlled by the setting of potentiometer POT.

In alternative embodiments hydraulic valve means (not shown) direct the fluid being exhausted from cylinder 21 through pump 31 (instead of fluid motor 70) which drives motor M (instead of alternator ALT) in the reverse direction so that it acts as a generator to charge battery BATT.

Where only a single embodiment of our invention has been illustrated and described, many modifications and variations thereof will be readily apparent to those skilled in the art, and consequently it should be understood that we do not intend to be limited to the particular embodiment shown and described.

The embodiments of the invention in which an exclusive property or privilege is claimed are defined as follows:

1. In combination with an electric lift truck energized from an electric battery to supply pressurized fluid to a lift ram which elevates a load supporting carriage, an energy recovery system for converting the kinetic energy of said elevated carriage into battery charging current comprising
    a fluid motor,
    means for directing fluid exhausted from said lift ram through said fluid motor when said carriage is descending,
    unidirectional current generating means for charging said battery including a rotatable generator driven by said fluid motor and having a field winding, and
    means for selectively controlling the rate of descent of said carriage comprising transistor means for energizing said field winding to regeneratively brake said rotatable generator and said fluid motor which drives it during descent of said carriage and means for selectively varying the base drive of said transistor means to thereby regulate field excitation and the degree of regenerative braking.

2. In combination with an electric lift truck energized from an electric battery to supply pressurized fluid to a lift ram which elevates a load supporting carriage, an energy recovery system for converting the kinetic energy of said elevated carriage into battery charging current comprising a fluid motor, means for directing fluid exhausted from said lift ram through said fluid motor when said carriage is descending, unidirectional current generating means for charging said battery including a rotatable generator driven by said fluid motor and having a field winding, means for selectively controlling the rate of descent of said carriage comprising transistor means for energizing said field winding to regeneratively brake said rotatable generator and said fluid motor which drives it during descent of said carriage and means for selectively varying the base drive of said transistor means to thereby regulate field excitation and the degree of regenerative braking, and wherein said means for selectively varying base brake includes means responsive to a predetermined rpm of said fluid motor for applying base drive to said transistor means to turn it on and thereby slow the descent of said carriage and charge said battery.

3. In the combination of claim 2 wherein said rotatable generator is an alternator and including rectifier means between said alternator and said battery.

4. In an electric lift truck having an electric battery energizing an electric motor for supplying pressurized fluid to a lift ram which elevates a load supporting carriage, an energy recovery system for converting the kinetic energy of said elevated carriage into battery charging current and for controlling the rate of descent of said carriage comprising, in combination, a fluid motor, means for directing fluid exhausted from said ram through said fluid motor when said carriage is descending, an electric alternator having a field winding and being driven by said fluid motor, rectifier means between said alternator and said battery, a transistor having its emitter-collector circuit connected in a series circuit with said battery and said field winding, means responsive to a predetermined speed of said fluid motor for applying base drive to said transistor to turn it on and thereby regeneratively brake said alternator, and means for selectively adjusting the base drive of said transistor to thereby regulate alternator excitation and the rate of descent of said carriage.

5. In the combination of claim 4 wherein said means responsive to a predetermined speed of said fluid motor includes means for supplying a unidirectional trickle current from said battery to said field winding when said fluid motor is at rest, means coupled to an alternator stator winding for deriving a unidirectional potential whose magnitude is a function of the rpm of said alternator, and means responsive to a preselected magnitude of said unidirectional potential for applying base drive to said transistor to turn it on.

6. In the combination of claim 5 wherein the magnitude of base drive supplied by said last-named means is a function of the magnitude of said unidirectional potential, and said means for deriving a unidirectional potential includes potentiometer means for adjusting the proportionality factor between the voltage induced in said alternator stator winding and the magnitude of said unidirectional potential.

7. In combination with an electric lift truck having an electric battery energizing an electric motor for supplying pressurized fluid to a lift ram which elevates a load supporting carriage, an energy recovery system for converting kinetic energy of said elevated carriage into battery charging current and for controlling the rate of descent of said carriage comprising a fluid motor, means for directing fluid exhausted from said ram through said fluid motor when said carriage is descending, an electric alternator driven by said fluid motor and having field and stator windings, rectifier means between said alternator and said battery, means for supplying a trickle current from said battery to said field winding, a transistor connected in a series circuit with said battery andn said field winding, means coupled to a stator winding of said alternator for deriving a unidirectional potential which is a function of the rpm of said alternator and the magnetic flux density of the field generated by said field winding, means responsive to a predetermined magnitude of said unidirectional potential to supply base drive to said transistor and thereby increase field excitation, whereby charging current is supplied from said rectifier means to said battery and said alternator is regeneratively braked, and rate-of-descent adjusting means for selectively varying the base drive of said transistor to thereby regulate the field winding current and the mechanical loading of said fluid motor.

8. In the combination of claim 4 wherein said rate-of-descent adjusting means for selectively varying the base drive of said transistor includes potentiometer means for selectively varying the proportionality factor between the voltage induced hn said stator winding and the magnitude of said unidirectional potential.

9. In combination with an electric lift truck having an electric battery energizing an electric motor for supplying pressurized fluid to a lift ram which elevates a load supporting carriage, an energy recovery system for converting the kinetic energy of the raised carriage into battery charging current and for controlling the rate of descent of said carriage comprising a fluid motor, means for directing fluid exhausted from said ram when said carriage is descending through said fluid motor, means for charging said battery including a rotatable generator driven by said fluid motor and having a field winding, a transistor having its emitter-collector circuit in series with said battery and said field winding, and means responsive to a predetermined rotational speed of said fluid motor for turning said transistor on to energize said field winding and thereby charge said battery and slow the descent of said carriage.

10. In the combination of claim 9 and including rate-of-descent adjustment means for selectively varying the base drive of said transistor to thereby regulate field excitation and the regenerative braking of said fluid motor.

11. In the combination of claim 9 wherein said rotatable generator is an alternator and including rectifier means between said alternator and said battery.

12. In the combination of claim 10 wherein said means responsive to a predetermined rotational speed of said fluid motor for turning said transistor on includes
   means coupled to a stator winding of said generator for deriving a unidirectional potential whose magnitude is a function of the generator rotational speed, and
   means including a breakdown device for applying base drive to said transistor to turn it on when said unidirectional potential reaches a predetermined magnitude.

13. In the combination of claim 12 wherein said emitter-collector circuit of said transistor is connected in a series circuit with said field winding and said battery, and said means for deriving a unidirectional potential includes means for supplying a trickle current from said battery to said field winding.

14. In the combination of claim 13 wherein said means for deriving a unidirectional potential includes a potentiometer for selectively regulating the proportionality factor between the voltage induced in said stator winding and the magnitude of said unidirectional potential, and said rate-of-descent adjusting means includes said potentiometer.

* * * * *

UNITED STATES PATENT OFFICE
CERTIFICATE OF CORRECTION

Patent No. 3,947,744          Dated March 30, 1976

Inventor(s) Michael H. Grace and Arvin Karazija

It is certified that error appears in the above-identified patent and that said Letters Patent are hereby corrected as shown below:

Column 5, line 17, "brake" should read -- drive --;
Column 6, line 21, "andn" should be -- and --;
Column 6, line 41, "hn" should be -- in --.

Signed and Sealed this

Thirty-first Day of August 1976

[SEAL]

Attest:

RUTH C. MASON
Attesting Officer

C. MARSHALL DANN
Commissioner of Patents and Trademarks